Figure 1:
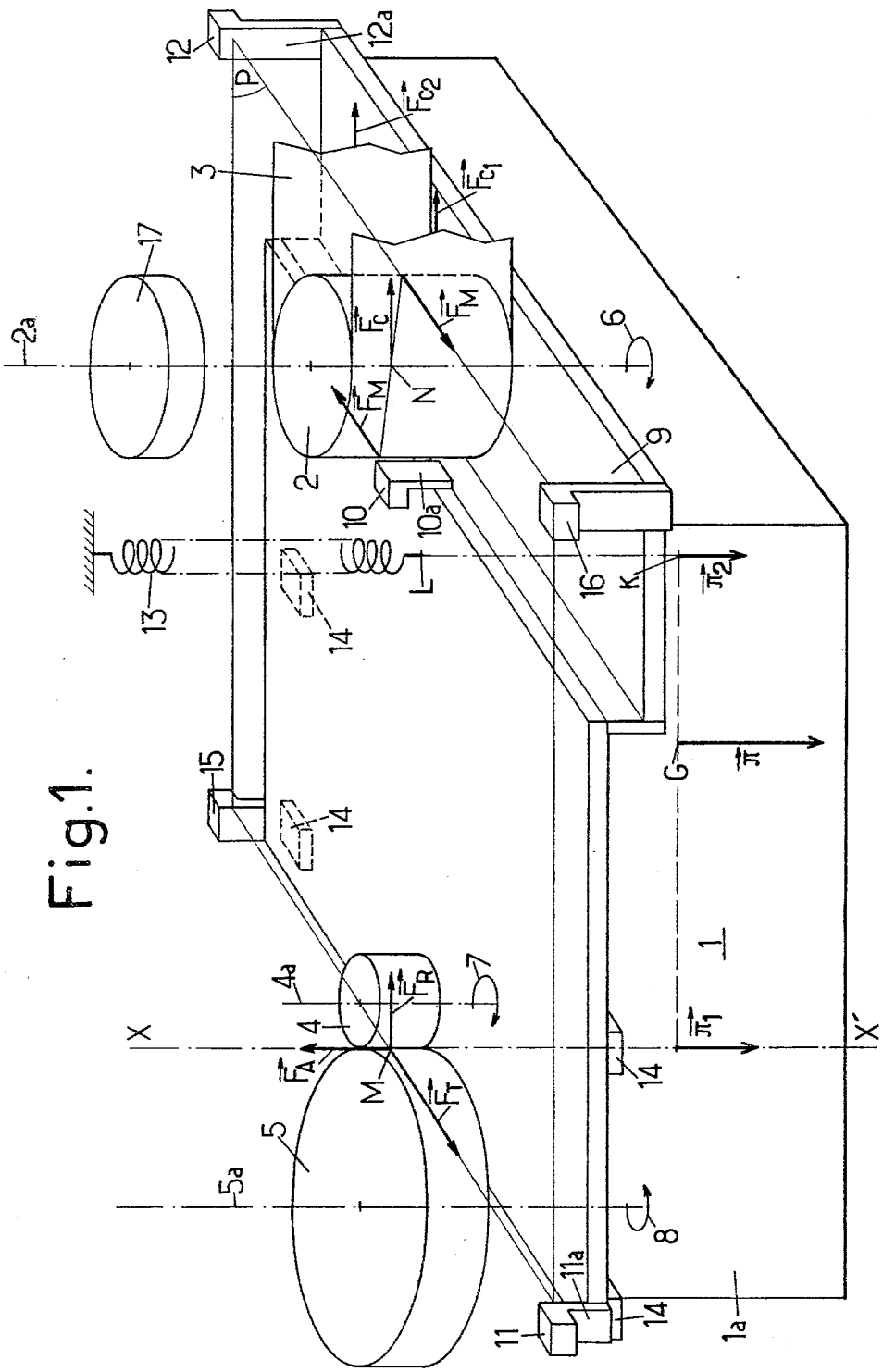

United States Patent [19]

Bruyére

[11] 4,201,100

[45] May 6, 1980

[54] MACHINES, PARTICULARLY MACHINE-TOOLS, DRIVEN THROUGH A GEAR DEVICE

[75] Inventor: Marcel F. M. Bruyére, Bois Colombes, France

[73] Assignee: Societe dite: Berthiez, Paris, France

[21] Appl. No.: 972,082

[22] Filed: Dec. 21, 1978

[30] Foreign Application Priority Data

Dec. 23, 1977 [FR] France .................. 77 38940

[51] Int. Cl.$^2$ .................................................. B23B 9/00
[52] U.S. Cl. ...................................................... 82/2 D
[58] Field of Search .................................. 82/2 D, 2 R

[56] References Cited

U.S. PATENT DOCUMENTS

| | | | |
|---|---|---|---|
| 3,400,619 | 9/1968 | Wagner et al. | 82/2 D |
| 3,720,134 | 3/1973 | Zeleny | 82/2 D |
| 3,736,840 | 6/1973 | Durand | 82/2 D |

*Primary Examiner*—Harrison L. Hinson
*Attorney, Agent, or Firm*—Larson, Taylor and Hinds

[57] ABSTRACT

The invention concerns a machine, particularly a machine-tool, driven by motive means through a gear device, the transmission of the movement of the gear device to the machine being effected by meshing of an output pinion of the device with a fixed axis ring gear of the machine, this gear device being housed in a casing independant of the machine and fixed thereon by resilient means.

These resilient means, on the one hand, comprise at least one spring fixed to the casing to cancel out that component of the weight of the casing which is not borne by the meshing axis of the output pinion of the casing with the ring gear of the machine and, on the other hand, are arranged so that the forces (actions and reactions) exerted on the casing are either borne by the meshing axis of the output pinion of the casing with the ring gear of the machine, or else are situated in the mean plane (P) of the output pinion of the casing perpendicular to the axis of said pinion, with which arrangement it is possible to maintain as accurately as possible an equipollence between the axis of the output pinion of the device and the fixed axis of the ring gear of the machine.

10 Claims, 4 Drawing Figures

MACHINES, PARTICULARLY MACHINE-TOOLS, DRIVEN THROUGH A GEAR DEVICE

The present invention concerns improvements to machines, particularly machine tools, driven by motive means through a gear device, the transmission of the movement of the gear device to the machine being effected by meshing of an output pinion of the device with a fixed axis ring gear of the machine, this gear device being housed in a casing independent of the machine and fixed on this latter by resilient means.

In operation, gear movement transmission devices are, generally, the seat of machanical vibrations generated in particular by the meshing of the toothed wheels. In large size machine tools, such as vertical lathes, in which the gear device forms an integral part of the machine or else is rigidly fixed to the frame thereof, the vibrations are transmitted directly to the machine. When this latter operates in no load or partial load conditions, these vibrations are substantial and are the cause of noises whose sound level is very high and may reach 90 dB and even more.

A sound level of this magnitude is a source of considerable discomfort, particularly when several machines are operating simultaneously in a workshop.

Moreover, because of the great rigidity of the frames of this kind of machine, the vibrations transmitted through the solid material reach the tool and it is then difficult, even impossible, to increase the machining accuracy beyond a certain limit.

Attempts have already been made to remedy these disadvantages by fixing the gear device on the machine by means of insulating elements, from the vibratory point of view, such as studs or cushions.

However, with such an arrangement, the gear device may, because of the relative resilience of the materials forming these elements, move substantially in relation to the machine.

In the case of the machines to which the invention more particularly relates—i.e. those in which the output pinion of the gear device meshes with a fixed axis ring gear of the machine—these relative movements form a considerable disadvantage for a smooth drive of the tool or of the machined workpiece can no longer be ensured: for this reason, the machining cannot then be as accurate as desired.

The invention has essentially as its aim to remedy the disadvantage outlined above, by suppressing as much as possible the transmission of vibrations from the gear device to the machine, so that the sound level of the machine in operation is appreciably reduced and so that the workpieces may be machined with greater accuracy and so that, despite the use of insulating means, from the vibratory point of view, the relative movements of the gear device and of the machine, during operation, are such that they do not affect the machining accuracy, these aims being attained, while using only simple and inexpensive means whose use does not require appreciable modification of the machine.

To this end, it is provided, in accordance with the invention, that the resilient means, on the one hand, comprise at least one spring fixed to the casing for cancelling out that component of the weight of the casing which is not borne by the meshing axis of the output pinion of the casing with the ring gear of the machine and, on the other hand, are arranged so that the forces (actions and reactions) exerted on the casing are either borne by the meshing axis of the output pinion of the casing with the ring gear of the machine or else situated in the mean plane (P) of the output pinion of the casing, perpendicular to the axis of said pinion.

With this arrangement, the gear device of the machine is isolated, from the vibratory point of view, so that the vibrations are not transmitted to the machine, or at least only reach it in a very attenuated from compatible with the high machining accuracy which we are entitled to expect from machine-tools of this kind.

Moreover, this arrangement allows an equipollence to be maintained as exactly as possible against the axis of rotation of the output pinion of the device and the fixed rotational axis of the ring gear of the machine, i.e. these axes remain constantly parallel to one another: the result is that the meshing axis remains constant since the ring gear is assumed fixed: any relative movement of the gear device and the machine affects then in no wise the smooth meshing of the pinion and of the ring gear, which contributes to promoting a higher accuracy of machining.

In the case where the motive means drive the gear device through a rotating input member of the gear, toothed wheel, pulley or similar kind, the axis of the rotating input member is parallel to the axis of the output pinion of the casing, the mean plane of the rotating input member coincides with the mean plane (P) of the output pinion, and said resilient fixing means comprise lateral resilient stops for counterbalancing the reactions exerted on the casing under the tangential meshing reaction of the output pinion and the toothed wheel and of the torque which is transmitted thereto by the rotating input member, said stops being disposed in said plane (P).

In the case where the motive means drive the gear device through a transmission having an axis parallel to the mean plane (P) of the output pinion, it is advisable for this transmission to have two parallel contrarotating shafts transmitting equal torques, preferably coupled to one another through a differential.

Furthermore, the resilient means comprise at least one axial resilient stop for counterbalancing the radial meshing reaction of the output pinion and the ring gear and the component, according to this radial meshing reaction, exerted on the casing by the rotating input member.

It is also provided for the resilient fixing means to comprise resilient rests supporting the casing and arranged so that the resultant of their reactions on the casing counterbalance the axial meshing reaction of the output pinion and the ring gear and the component of the weight of the casing borne by the meshing axis of the output pinion and the ring gear.

So that the machine may keep all its possibilities of use, it is advantageous for the resilient fixing means to be arranged so as to allow the machine to be driven in either direction.

Moreover, in the case where the rotating input member of the gear device is driven by at least one endless connection (belt or chain), a viscous shock-absorber or a tuned shock absorber is provided mounted on the shaft of the rotating input member and arranged to damp down the oscillatory torque variations due to the resilience of the endless connection transmission. This latter arrangement reduces even further the noise generated by the machine and increases its smoothness of operation.

Figure 2:
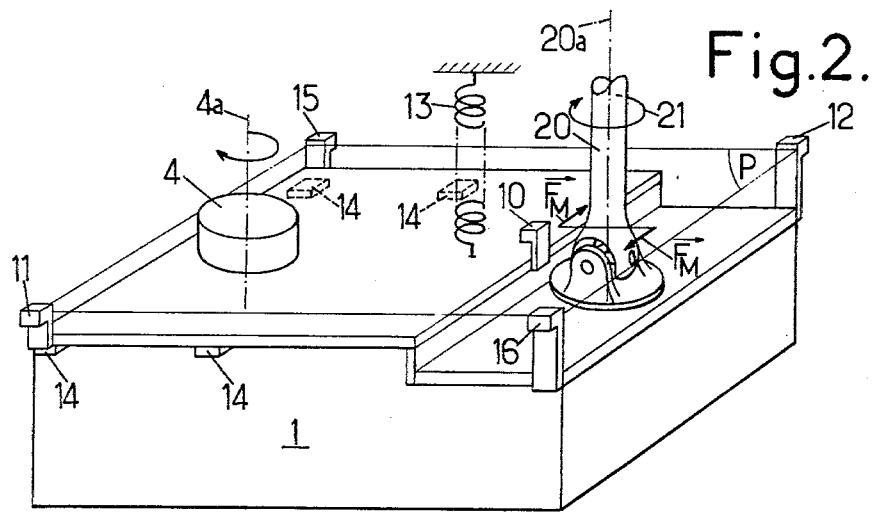
Figure 3:
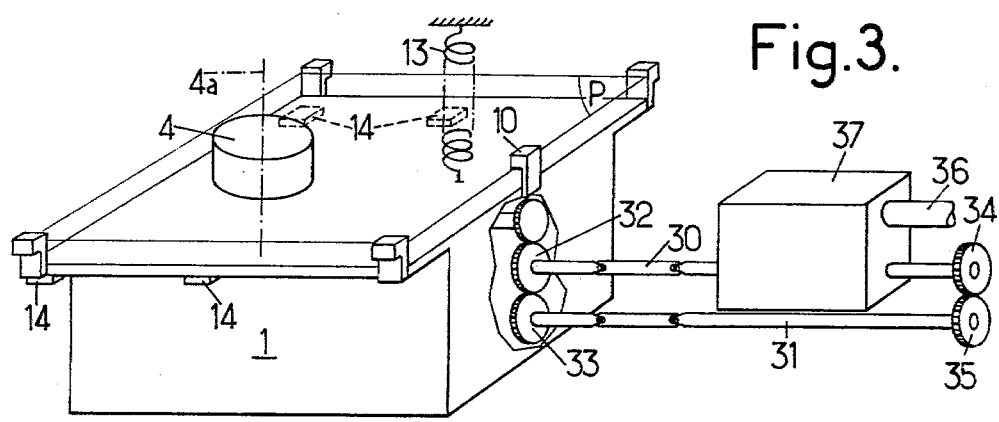
Figure 4:
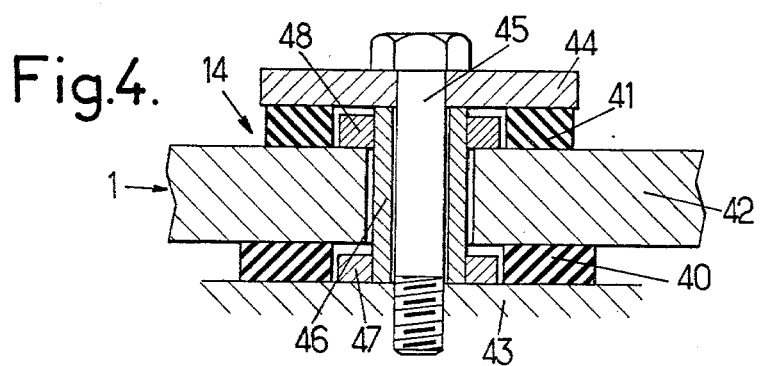

The invention will be better understood with the help of the description which follows of some of its embodiments given by way of illustrative but in no wise limitative examples. In this description, reference is made to the accompanying drawings in which:

FIGS. 1 through 3 are perspective views showing schematically different embodiments of the invention, and FIG. 4 shows a constructional detail of FIGS. 1 to 3.

FIG. 1 shows, very schematically, a gear device, for example a gear box 1 housed in a casing 1a and intended to transmit to a machine tool (of which only the input ring gear 5 is shown) a rotational movement supplied by a motive element (not shown).

Gear box 1 receives the movement through a rotating input member of the gear type, driven by the output gear of the motive element, or a chain driven toothed wheel, or else preferably, as shown in FIG. 1, a pulley 2 driven by a belt 3 or any other similar member.

At its output, gear box 1 drives, through a pinion 4 with axis 4a, parallel to axis 2a of pulley 2, a toothed wheel 5 with axis 5a parallel to the axis 4a of pinion 4 and carried by the machine-tool as is indicated above. Because of the substantial weight of the machine tool and of its anchorage to the ground or to an appropriate support, the machine cannot be subjected to any movement during operation and axis 5a of the toothed wheel 5 is assumed strictly fixed. To give an idea, it will be assumed that pulley 2, pinion 4 and ring gear 5 rotate about their respective axes in the direction shown by arrows 6, 7 and 8 respectively.

Furthermore, it has been assumed, with a concern for generalization, that pinion 4 and ring gear 5 were provided with helical teeth.

Therefore, the stresses which, during operation are exerted on gear box 1 are the following:

1. on the one hand, the reaction of ring gear 5 on pinion 4, which reaction in the case considered may be broken down, in a known way, into a tangetial reaction $\vec{F}_T$
    an axial reaction $\vec{F}_A$
    a radial reaction $\vec{F}_R$ these three forces being orthogonal to each other and originating commonly at point M situated half way up pinion 4 on the meshing axis XX' of said pinion with ring gear 5;

2. on the other hand, the weight $\vec{n}$ of the gear box applied to the centre of gravity G thereof;

3. and, finally, the stresses caused by pulley 2, i.e. a driving torque comparable to two forces $\vec{F}_M$, equal and opposed, perpendicular to the axis of the pulley and whose lever arm passes through point M situated half way up the pulley on the axis of rotation thereof, and a force $\vec{F}_C$ applied to point N which is the resultant of tensions $\vec{F}_{C1}$ and $\vec{F}_{C2}$ exerted on the two sides of belt 3.

In accordance with the invention, gear box 1 forms a unit independent of the machine-tool and fixed to the frame thereof through resilient means, arranged so that the axis of the output pinion remains parallel to the axis of the ring gear whatever the operating conditions of the machine.

To satisfy this condition, the resilient means are arranged so that the forces (actions and reactions) which are exerted on gear box 1 are borne by the meshing axis XX' or else are situated in the plane (P) which is the plane containing the point M and perpendicular to the meshing axis XX'.

For this purpose, the casing of box 1 is arranged so that point N (which, as indicated above, is siuated half way up pulley 2 on axis 2a thereof) is situated in plane (P), for example by providing in casing 1a a recessed part on which pulley 2 is disposed.

Furthermore, between the frame of the machine and gear box 1, there is provided a resilient axial stop 10, (i.e. whose reaction is directed parallel to forces $\vec{F}_R$ and $\vec{F}_C$) for counterbalancing force $\vec{F}_C$ and reaction $\vec{F}_R$ and resilient side stops 11,12 for counterbalancing reaction $\vec{F}_T$ and the reactions due to the drive torque transmitted by the pulley and schematized by forces $\vec{F}_M$. Resilient stops 10,11,12 are disposed so that the reactions which they exert on box 1 are situated in plane (P), as mentioned above; for this purpose, the stops may be carried by lugs 10a, 11a, 12a respectively, of a suitable height, fixed to the casing of the box, as shown in FIG. 1.

Finally, the weight $\vec{n}$ of gear box 1 may be broken down into two forces: $\vec{n}_1$ borne by the axis XX' and $\vec{n}_2$ applied at a point K situated on the perpendicular to axis XX' passing through point G.

Force $\vec{n}_2$ is cancelled by the force developed by a long vertical spring 13 fixed to gear box 1 at point L (situated on the line of action of force $\vec{n}_2$) and practically insensitive to the small movements of the box in plane (P) or vertically.

To counterbalance the forces borne by axis XX', it is provided to support the gear box 1 on rests formed by resilient studs 14 placed between casing 1a of the box and the frame of the machine. Two resilient studs disposed symmetrically to each other in relation to axis XX' may be used. However, to increase the stability of the fixing of the box, it is preferable to increase the number of studs 14 and to provide, for example, four as shown in FIG. 1; these resilient studs are then disposed so that the resultant of their reactions are borne by axis XX' and their surfaces are determined so that they support equal pressures and therefore that they are subjected to equal crushing through the action of a force borne by axis XX'.

When the machine-tool is driven in the reverse direction from that shown by arrow 8, forces $\vec{F}_A$, $\vec{F}_T$ and $\vec{F}_M$ change direction whereas forces $\vec{n}$, $\vec{F}_R$ and $\vec{F}_C$ remain constant. In this case, axial stop 10 has not been modified, but two other side stops 15 and 16 must be provided, which may be symmetrical with stops 11 and 12. As for studs 14, they must be dimensioned taking into account the fact that the two forces $\vec{F}_A$ and $\vec{n}$ are then directed in the same direction. An example of constructing studs 14 answering these requirements will be given further on.

In the case shown in FIG. 1 where gear box 1 receives the movement through a pulley, there may be produced, in off load or partial load operation, oscillatory variations of torque due to the resilience of belt 3. These sudden and rapid variations generate mechanical vibrations tending to increase the noise emitted by the machine.

To get over this disadvantage, a shock absorber 17, mounted on the pulley shaft, damps down the above-mentioned torque variations, this shock absorber being either a viscous shock absorber or a tuned shock absorber.

It will be noted that the position of studs 14 in the directions parallel to axis XX' is not critical. In particular, these studs may be disposed in plane (P). In this case it is possible to combine some of studs 14 and some of side stops 11,12,15 and 16 so that each member thus formed participates simultaneously in supporting the box and buttressing the drive torque.

In the embodiment shown in FIG. 2 (in which identical elements to those of FIG. 1 are shown by the same reference numbers), the gear box 1 receives the driving movement through a shaft 20 whose axis 20a is substantially parallel to axis 4a of pinion 4 and which rotates in the direction shown by arrow 21.

The drive torque transmitted by the shaft is comparable to two forces $\vec{F}_M$ situated in plane (P).

For this reason, the gear box is fixed to the frame of the machine in the same way as in the case of the arrangement of FIG. 1, except that, since the resultant $\vec{F}_C$ of the tensions $\vec{F}_{C1}$ and $\vec{F}_{C2}$ of the belt no longer exist, the axial stop is now dimensioned so as to counterbalance only the reaction $\vec{F}_R$.

In the case shown in FIG. 3 (in which elements identical to those of FIG. 1 are shown with the same numerical references) where gear box 1 is driven by a shaft transmission, particularly parallel to plane (P), said transmission is formed by two contra-rotating shafts 30 and 31 parallel to each other. These shafts are coupled, at each of their ends, by gears 32,33 and 34,35 and drive shaft 36 drives one of the shafts, e.g. shaft 30, through a torque equalizer differential 37.

Since shafts 30 and 31 rotate in opposite directions from each other and permanently transmit equal torques, this transmission exerts no reaction on gear box 1, and the purpose of the side stops is then only to counterbalance the tangential force $\vec{F}_T$. Furthermore, as in the case of the device of FIG. 2, the axial stop 10 is dimensioned to counterbalance only reaction $\vec{F}_R$.

It will be noted that, because of the advantages (suppression of stresses exerted on gear box 1) provided by this type of transmission, the two shafts 30 and 31 do not need necessarily to be parallel to plane (P) and may be disposed in any direction.

FIG. 4 shows an embodiment of a stud 14 arranged to allow the machine to operate in both directions.

Two plates 40 and 41 made from a resilient material (e.g. from rubber) are disposed, on the one hand, between wall 42 of gear box 1 and the frame 43 of the machine and, on the other hand, between said wall 42 and a guard plate 44, the assembly being held by a bolt 45 passing through guard plate 44, plate 41, wall 42 and plate 40 and screwed into frame 43. A sleeve 46 surrounding the shank of bolt 45 holds the guard plate at a constant distance from frame 43 and allows bolt 45 to be locked.

When the machine-tool is operating in no load or partial load conditions one of the resilient plates 40 and 41 is crushed under the action of the stresses to which the gear box 1 is subjected.

To avoid excessive crushing of the resilient plates when the machine is operating on full load, there is disposed, coaxially to plates 40,41, hard stops 47,48 against which wall 42 of box 1 or the guard plate 44 abut respectively.

It will be noted that the bearing surface of resilient plate 40 is larger than that of resilient plate 41 because the forces $\vec{F}_A$ and $\vec{n}_1$ are directed either in a contrary direction to one another, or in the same direction according as to whether the pinion rotates in the direction of arrow 7 or in the reverse direction respectively.

With the arrangements provided in accordance with the invention, all the forces exerted on the gear device are counterbalanced so that the only possible movement of said device in relation to the machine-tool takes place parallel to the meshing axis XX'. For this reason, the smoothness of the ringgear drive is then in no way impaired whereas the vibrations caused in the gear device are not transmitted to the machine—and so to the tool—because of the resilient fixing of the device.

The result is that the sound level of the noises emitted considerably reduced; it is also possible to machine parts with greater accuracy; finally there is considerable reduction of the reactions appearing when the tool of the machine comes into contact with the material of the workpiece, for example when, in a lathe, the tool works on a piece having surfaces to be machined separated by hollow portions—discontinuous machining.

As is evident and as it follows moreover already from what has gone before, the invention is in no wise limited to those of its embodiments and modes of application which have been more especially considered; it embraces, on the contrary, all variations thereof.

I claim:

1. A machine, particularly a machine-tool, driven by drive means through a gear device, in which the output movement of the gear device is transmitted to the machine by an output pinion of the gear device thereof meshing with a fixed axis ring gear of the machine, said gear device being housed in a casing independent of the machine and fixed thereon by resilient means, wherein said resilient means, on the one hand, comprise at least one spring fixed to the casing so that to cancel out that component of the weight of the casing which is not borne by the meshing axis of the output pinion of the gear device with the ring gear of the machine and, on the other hand, are arranged so that the forces (actions and reactions) exerted on the gear device casing are either borne by the meshing axis of the output pinion of the gear device with the ring gear of the machine, or else are situated in the mean plane (P) of the gear device output pinion which is perpendicular to the axis of said pinion, whereby it is possible to maintain as accurately as possible an equipollence between the axis of the output pinion of the gear device and the fixed axis of the ring gear of the machine.

2. A machine according to claim 1, in which the drive means drives the gear device through a rotating input member of the gear, toothed wheel, or pulley or similar type, wherein the axis of the rotating input member is parallel to the axis of the output pinion of the gear device, wherein the mean plane of the rotating input member coincides with the mean plan (P) of said output pinion, and wherein said resilient fixing means comprise lateral resilient stops for counterbalancing the reactions exerted on the casing under the action of the tangential meshing reaction of the output pinion and of the ring gear and of the torque which is transmitted thereto by the rotating input member, said stops being disposed in said plane (P).

3. A machine according to claim 1, in which the drive means drive the gear device through a transmission having a shaft parallel to the plane (P) of the output pinion of the gear device, wherein said transmission comprises two parallel contra-rotating shafts transmitting equal torques.

4. A machine according to claim 3, wherein the two contra-rotating shafts are coupled to one another by differential gear means.

5. A machine according to any one of claim 1, wherein said resilient means comprise furthermore at least one axial resilient stop for counterbalancing the radial meshing reaction of the output pinion and of the ring gear and the component, according to said radial meshing reaction, exerted on the casing by the rotating input member.

6. A machine according to any one of claim 1, wherein the resilient fixing means comprise resilient rests supporting the casing and arranged so that the resultant of their reactions on the casing counterbalance the axial meshing reaction of the output pinion and of the ring gear and of the component of the weight of the casing borne by the meshing axis of the output pinion with the ring gear.

7. A machine according to claim 6, wherein the resilient rests are disposed in said plane (P).

8. A machine according to claim 6 wherein at least some of the stops and the resilient rests are combined together.

9. A machine according to claim 1, wherein the resilient fixing means are arranged to allow the machine to be driven in one direction or the other.

10. A machine according to claim 2 in which a rotating input member of the gear device is driven by at least one endless transmission member (belt or chain), wherein there is provided a viscous or tuned shock absorber device, mounted on the shaft of the rotating input member and arranged to damp down the oscillatory torque variations due to the resilience of the endless transmission member.

* * * * *